(12) United States Patent
Sekino et al.

(10) Patent No.: US 8,247,694 B2
(45) Date of Patent: Aug. 21, 2012

(54) PROTECTOR STRUCTURE FOR ELECTRIC POWER FEEDING APPARATUS

(75) Inventors: Tsukasa Sekino, Shizuoka (JP); Seiji Iwahara, Shizuoka (JP); Makoto Nagasaki, Aichi (JP); Akihito Kouketsu, Aichi (JP); Hiroyuki Wakamatsu, Aichi (JP); Ryuuya Ishimaru, Aichi (JP); Yoshihiko Nakahama, Aichi (JP)

(73) Assignees: Yazaki Corporation, Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 300 days.

(21) Appl. No.: 12/596,901

(22) PCT Filed: Mar. 12, 2009

(86) PCT No.: PCT/JP2009/054804
§ 371 (c)(1),
(2), (4) Date: Oct. 21, 2009

(87) PCT Pub. No.: WO2009/113636
PCT Pub. Date: Sep. 17, 2009

(65) Prior Publication Data
US 2010/0089609 A1 Apr. 15, 2010

(30) Foreign Application Priority Data

Mar. 14, 2008 (JP) ................................. 2008-065312
Apr. 23, 2008 (JP) ................................. 2008-112168

(51) Int. Cl.
*H02G 3/00* (2006.01)

(52) U.S. Cl. ............ 174/70 R; 174/69; 174/101; 16/221
(58) Field of Classification Search .............. 174/70 R, 174/69, 135, 101; 16/221; 242/388.9
See application file for complete search history.

(56) References Cited

U.S. PATENT DOCUMENTS 6,479,750 B1 * 11/2002 Popescu et al. ............. 174/70 R
6,528,728 B1 * 3/2003 Shima .......................... 174/101
(Continued)

FOREIGN PATENT DOCUMENTS
JP 3-26639 3/1991
(Continued)

OTHER PUBLICATIONS

International Search Report for International Application No. PCT/JP2008/054484 dated Apr. 2, 2008.

*Primary Examiner* — Dhirubhai R Patel
(74) *Attorney, Agent, or Firm* — Kratz, Quintos & Hanson, LLP

(57) ABSTRACT

A curved wall portion along which a wiring harness is bendably extended has a foreign-matter-escape side opening, at one wall continuing to a top opening of an upward guiding cylinder of a protector. A foreign-matter-escape side opening on the other wall of the cylinder proximate to the opening is opposed to the curved wall portion. A projection on the other wall in the guiding cylinder and below the side opening of the wall has an upwardly sloping surface continuing thereto. A projection in the guiding cylinder is above the side opening of the other wall, traversing the cylinder. The protector includes one separate protector member and the other separate protector member, the former having a projection extending toward the latter to cover a joining area thereof.

5 Claims, 8 Drawing Sheets

U.S. PATENT DOCUMENTS 6,878,881 B1 * 4/2005 Henry .................. 174/101

FOREIGN PATENT DOCUMENTS

| | | |
|---|---|---|
| JP | 8-113098 | 5/1996 |
| JP | 2000-36153 | 2/2000 |
| JP | 2000-108674 | 4/2000 |
| JP | 2001-222924 A1 | 8/2001 |
| JP | 2002-91674 A1 | 3/2002 |
| JP | 2002-112444 A1 | 4/2002 |
| JP | 2005-59745 A1 | 3/2005 |
| JP | 2006-15981 A1 | 1/2006 |
| JP | 2006-134860 A1 | 5/2006 |
| JP | 2007-328990 A1 | 12/2007 |

* cited by examiner

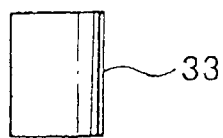
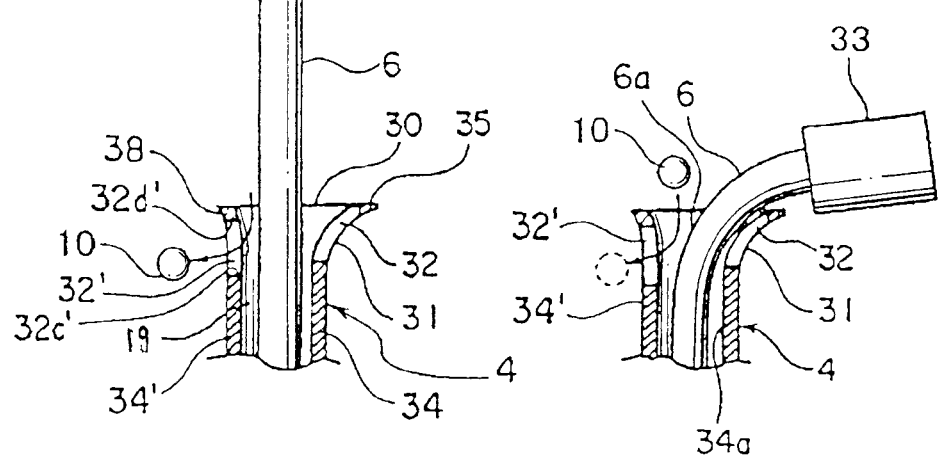
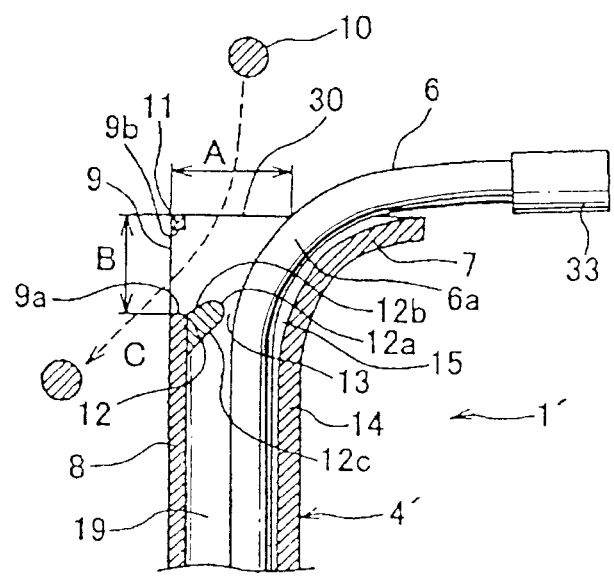

PROTECTOR STRUCTURE FOR ELECTRIC POWER FEEDING APPARATUS

TECHNICAL FIELD

The present invention relates to a protector structure for an electric power feeding apparatus that includes a protector adapted to accommodate a wiring harness that can be pulled out thereof in directions of movement of a movable structure such as a roof of an automobile.

BACKGROUND ART

FIGS. 12 and 13 illustrate conventional protector structures for an electric power feeding apparatus (see the patent literature PTL 1).

As shown in FIG. 12, the conventional electric power feeding apparatus 61 is a wiring-harness-extendable/retractable-type apparatus that includes: a protector 62 made of synthetic resin, which includes a circular body portion 65 and an elongated guiding cylinder 66 extending upward; a drum 63 rotatably provided inside of the protector; a spiral spring 64 that energizes the drum 63 in a direction of rotation; and, as a foreign matter escape structure, a hole 70 provided at a base of the guiding cylinder 66 of the protector 62 and a secondary hole 71 provided at the lowest portion of the body portion, so that foreign matters such as a grit and a dust entering the guiding cylinder via an opening at a upper end thereof escape from the protector 62 to an outside via the holes 70, 71.

The body portion 65 and the guiding cylinder 66 are provided in one piece with each other. The guiding cylinder 66 extends with a rectangular cross section. The guiding cylinder 66 protrudes upward from an upper portion of the body portion 65 and curves to trace an arc with a large radius.

As shown in FIG. 13, the drum 63 and the spiral spring 64 are accommodated in the body portion 65. The drum 63 is rotatably supported by a shaft 67. The wiring harness 68 is wound in around a periphery of the drum 63. As shown in FIG. 12, one portion 68a of the wiring harness 68 is pulled out via the guiding cylinder 66 to the outside.

As shown in FIG. 13, the other portion 68b of the wiring harness 68 is wound around a periphery of the drum 63 as an extra length of the wiring harness to be accommodated in the body portion. The harness portion 68c continuing to the extra length 68b of the wiring harness is pulled out of the body portion 65 to the outside to be connected to a power source (battery). The extra length of the wiring harness 68b absorbs the rotation of the drum 63.

The protector 62 includes a protector base 62a and a protector cover 62b. The wiring harness 68 is accommodated in the protector base 62a with the protector cover 62b detached therefrom, and then retained by the protector base 62a with the protector cover 62b attached thereto. The wiring harness 68 includes a plurality of electrical wires each having an insulating sheath. The electrical wires (68) may be coarsely bound with a tape or softly covered by a protective tube.

A connector 69 is provided at an end of the wiring harness 68. The connector 69 is fixed for example to a movable structure such as a sun roof and a deck lid (not shown) adapted to accommodating a roof of the automobile, the movable body being power-supplied by the feeding apparatus. The connector of the wiring harness of the feeding apparatus is connected to a connector of a mating wiring harness (not shown) of the movable structure.

For example, as indicated by a solid line in FIG. 12, the wiring harness 68 is pulled out of the protector 62 upward to elongatedly extend as the roof is opened. At this point, the drum 63 is rotating against a force of the spring 64, so that the wiring harness 68 is released from the drum 63. When the roof is closed, as indicated by a chained line in FIG. 12, the wiring harness 68 is rewound into the protector acted upon by the force of the spring 64 to be bent in a direction orthogonal to the opening 66a of the protector.

Since the opening 66a provided at the end of the guiding cylinder 66 is oriented upward, a foreign matter such as a dust easily enters the guiding cylinder via the opening 66a as the roof is opened. The intruding foreign matter escape from the cylinder to the outside via the hole 70 provided at the base of the guiding cylinder 66. The foreign matter that missed the hole 70 is allowed to escape from the body to the outside via the hole 71 provided at the bottom of the body portion 65.

As an example of an opening-closing mechanism of a retractable roof for a conventional automobile (not shown) is disclosed in the patent literature PTL 2. The roof opening-closing mechanism includes: a pair of (i.e., front and rear) rotative linkages rotatably linked to a body of an automobile; an upper-middle stationary linkage linked to the front rotative linkage, a front-upper stationary linkage linked to the rear rotative linkage; and a folding top linked to the front-upper stationary linkage. When the roof is folded (opened state), rotative linkages tilt substantially horizontally, and stationary linkages are folded above the rotative linkages, so that the roof is retracted in a rear luggage space of the automobile body.

Citation List

Patent Literature

PTL 1: Japanese Patent Application Laid-Open Publication No. 2002-112444 (FIGS. 1 to 4)

PTL 2: Japanese Patent Application Laid-Open Publication No. 2000-108674 (FIGS. 1 to 5)

SUMMARY OF INVENTION

Technical Problem

In the above conventional electric power feeding apparatus 61, when the wiring harness 68 is pulled in the orthogonal direction as indicated by an arrow B in FIG. 12, the wiring harness 68 is rubbed by the opening 66a provided at the edge (top portion) of the guiding cylinder 66. Also, when the wiring harness 68 is bent without contact with the opening 66a, the bent portion 68d is acted upon by a large stress.

As a countermeasure, in the conventional electric power feeding apparatus 44 shown in FIG. 14, a top opening 42 of the guiding cylinder 41 of the protector 45 has to be enlarged so as to take a shape of a bugle (widening toward the edge). However, in this case, as shown in FIG. 14, the foreign matters 10 such as a dust may easily get into the guiding cylinder 41 via the enlarged top opening 42.

For example, when the roof is opened, as indicated by the chained line, the foreign matter 10 staying inside of the top opening 42 is trapped between the wiring harness 43 bent as the roof in FIG. 14 is closed and an inner wall 41 a of the guiding cylinder 41. As a result, the wiring harness 43 cannot be smoothly pulled out or wound in and damage to the wiring harness 43 may result. In FIG. 14, the arrow indicates a direction in which the wiring harness 43 is pulled out and extended.

Also, when the wiring harness 6 is bent in the orthogonal direction as indicated by the arrow B and energizedly pulled out via the opening 66a of the guiding cylinder 6 in FIG. 12, the wiring harness 66 may be displaced upward and downward near the opening 66a and may be damaged due to interference with structures (not shown) such as other components and auxiliary units provided in the neighborhood.

Also, as shown in FIGS. 15A and 15B, in a case where the protector 45 is separately provided and there exists a joining area 46 at a wall 41b of the top opening 42, the wiring harness 43 that is pulled out obliquely upward may be brought into contact with the joining area 46 at the edge of the opening 42, causing wear and/or noise and making it difficult to ensure smooth sliding (pull-out and wind-in operation) of the wiring harness.

In view of the above, an object of the present invention, as the top opening of the guiding cylinder of the protector is enlarged in favor of bending of the wiring harness, is to provide a protector structure for the electric power feeding apparatus that is capable of preventing the foreign matters from entering the inside of the guiding cylinder via the enlarged top opening, and preventing the guiding cylinder from being clogged with the foreign matters, and in addition capable of preventing degradation of slidability of the wiring harness due to a joining area when a separate protector is provided.

Solution to Problem

In order to attain the above-identified objective, the protector structure for the electric power feeding apparatus according to the present invention includes a curved wall portion provided at one wall of an upward guiding cylinder of a protector, the curved wall portion extending along a top opening of the guiding cylinder so that a wiring harness being bendably pulled out along the curved wall portion, and having a side opening for exiting of a foreign matter.

By virtue of the above construction, when the wiring harness is pulled out upward via the top opening, the foreign matter that entered the guiding cylinder via the top opening thereof and from an upper region with respect to the curved wall portion falls and escapes to the outside via the side opening of the curved wall portion. Also, when the wiring harness is slightly bent and is pulled out upward via the top opening, the foreign matter coming in via the top opening hits the outer surface of the bent portion of the wiring harness and bounces back, so that the foreign matter escapes to the outside.

The protector structure for the electric power feeding apparatus according to a second aspect of the present invention further includes a curved wall portion provided at one wall of an upward guiding cylinder of a protector, the curved wall portion extending along a top opening of the guiding cylinder so that a wiring harness is bendably pulled out along the curved wall portion; and a side opening for letting out a foreign matter provided on the other wall of the guiding cylinder so as to be proximate to the top opening, the other wall being opposite the curved wall portion of the guiding cylinder.

By virtue of the above construction, the foreign matter that entered the protector via the top opening when the wiring harness is bent along the curved wall portion hits the outer surface of the bent portion of the wiring harness and bounces back, so that the foreign matter escapes from the protector via the side opening of the other wall to the outside.

The protector structure for the electric power feeding apparatus according to a third aspect of the present invention in addition to the features in the above first aspect, further includes a side opening for letting out a foreign matter provided on the other wall of the guiding cylinder so as to be proximate to the top opening, the other wall being opposite the curved wall portion of the guiding cylinder.

By virtue of the above construction, while the wiring harness is bent along the curved wall portion, the foreign matter that entered the protector via the top opening hits the outer surface of the bent portion of the wiring harness and bounces back, so that the foreign matter escapes from the protector via the side opening of the other wall to the outside.

The protector structure for the electric power feeding apparatus according to a fourth aspect of the present invention further includes a projection provided inside of the guiding cylinder and on the other wall so as to be lower than the side opening, the projection having an upwardly sloping surface continuing to the side opening.

By virtue of the above construction, the foreign matter coming in via the top opening falls toward the projection on the side of the other wall and escapes along the upwardly sloping surface of the projector, via the side opening, and to the outside.

The protector structure for the electric power feeding apparatus according to a fifth aspect of the present invention, in combination with the features in the second or third aspect, further includes a projection provided inside of the guiding cylinder and on the other wall so as to be above the side opening, the projection traversing inside of the guiding cylinder.

By virtue of the above construction, the projection is positioned immediately below (or proximate to) the top opening and the top opening to is narrowed by the projection, so that entry of the foreign matter into the guiding cylinder is prevented (deterred). Also, when the wiring harness is pulled and the wiring harness is curved 8 slightly bent) toward the other wall, the wiring harness is slidingly in contact with the projection, so that the sliding of the wiring harness on the edge-shaped end of the top opening and resulting wear of the wiring harness are prevented. It is preferable that the projection has a semicircular cross section.

In the protector structure for the electric power feeding apparatus according to a sixth aspect of the present invention, in combination with the features in the fifth aspect, the protector is divided into one separate protector member and the other separate protector member, the one separate protector member has the projection, and the projection extends towards the other separate protector member so that a joining area between the protectors is covered by the projection.

By virtue of the above construction, when the wiring harness is pulled out while curved (slightly bent) from the top opening toward the other wall, the wiring harness is slidably in contact with the projection and slidable contact of the wiring harness with the joining area at the top opening is prevented and wear and noise due to the contact and increased pull-out/wind-in force are also prevented.

Advantageous Effects of the Invention

According to the first aspect of the present invention, even when the top opening is enlarged and as a result the foreign matter can easily enter the inside, the intruding foreign matter can be evacuated to an outside via the side opening of the curved by way of gravity fall, and accordingly the intrusion of the foreign matter into the guiding cylinder and clogging of the guiding cylinder with the foreign matter are prevented, and thus, extraction and retraction of the wiring harness through the guiding cylinder can be always performed smoothly, and reliability of the continuous power supply is improved.

According to the second and third aspects of the present invention, since the foreign matter that hit and bounce from the bent portion of the wiring harness when the wiring harness is bent is evacuated to an outside via the side opening of the other wall, the intrusion of the foreign matter into the guiding cylinder and clogging of the guiding cylinder with the foreign matter are prevented, and extraction and retraction of the wiring harness through the guiding cylinder is always performed smoothly, and accordingly the reliability of the continuous power supply is improved.

According to the fourth aspect of the present invention, the foreign matter that fell on the projection from the top opening toward the side of the other wall is evacuated along the upper slanting surface of the projection from the side opening to an outside, and thus the intrusion of the foreign matter into the guiding cylinder and the clogging of the guiding cylinder with the foreign matter are prevented, and the extraction and retraction of the wiring harness through the guiding cylinder is always smoothly performed and reliability of the continuous power supply is improved.

According to the fifth aspect of the present invention, the top opening is contracted by means of the projection, so that intrusion of the foreign matter is deterred. Also, since the wiring harness is slidably in contact along the projection, the wear of the wiring harness due to contact with the edge-shaped end of the top opening is prevented, and thus the reliability of the continuous power supply is improved.

According to the sixth aspect of the present invention, since the wiring harness is slidably in contact along the projection, wear and noise caused by the wiring harness being brought into contact with the joining area at the end of the top opening can be prevented. At the same time, the wiring harness can be smoothly pulled out and wound in without getting caught, and thus reliability of continuous power supply and opening-closing operability of the movable structure to which the extracted wiring harness is connected are improved.

BRIEF DESCRIPTION OF THE DRAWINGS

FIG. 4A is a longitudinal cross-sectional view illustrating an essential part of the protector structure for the electric power feeding apparatus according to a second embodiment of the present invention.

FIG. 4B is another longitudinal cross-sectional view illustrating the essential part of the protector structure for the electric power feeding apparatus according to the second embodiment of the present invention.

FIG. 5 is a longitudinal cross-sectional view illustrating the protector structure for the electric power feeding apparatus according to a third embodiment of the present invention.

DESCRIPTION OF THE EMBODIMENT

Figure 1:
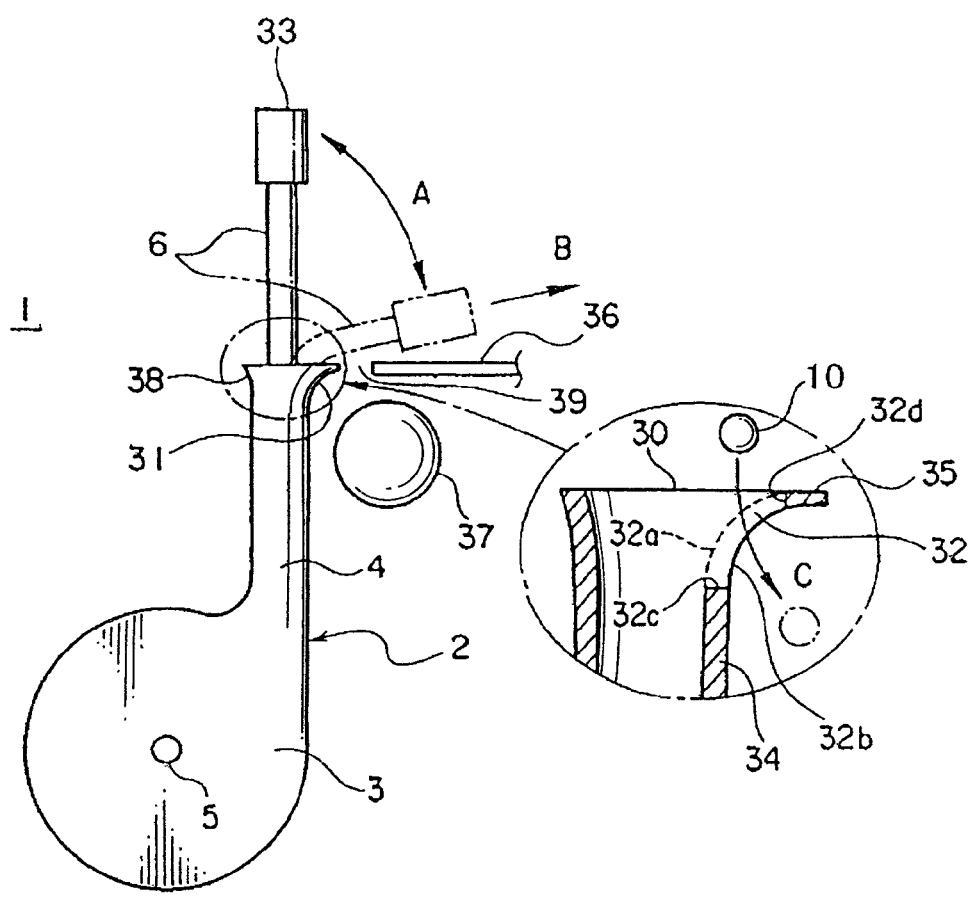
FIG. 1 is a front elevation of a protector structure for the electric power feeding apparatus according to a first embodiment of the present invention (with a partial enlarged cross sectional view in a balloon).
Figure 2A:
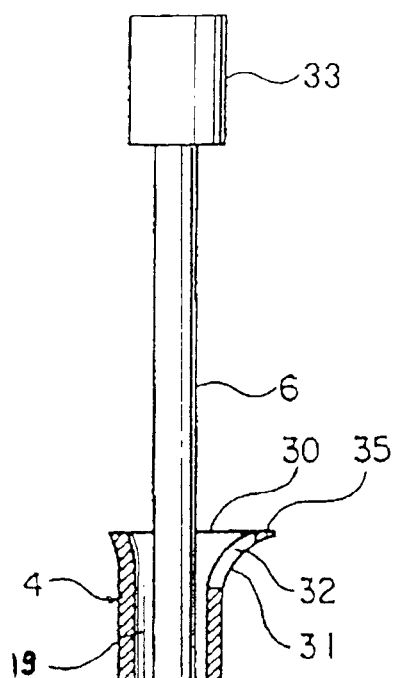
FIG. 2A is a longitudinal cross-sectional view illustrating a state where a wiring harness is pulled out of a guiding cylinder of the electric power feeding apparatus.
Figure 2B:
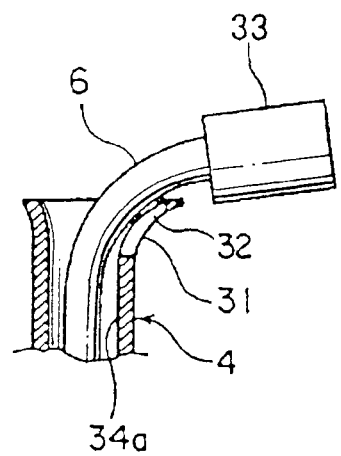
FIG. 2B is a longitudinal cross-sectional view of 2A taken in a different orientation.
Figure 3:
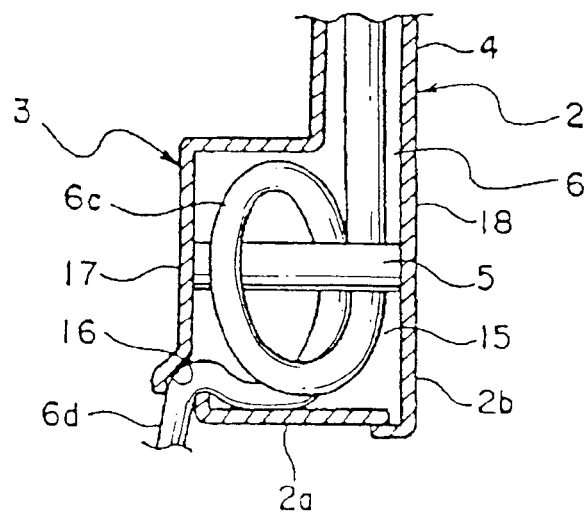
FIG. 3 is a longitudinal cross-sectional view illustrating an internal structure on the side of a body of the electric power feeding apparatus, the view inverted by 90 degrees with respect to the illustration of FIG. 1.

FIGS. 1 to 3 illustrate a protector structure for an electric power feeding apparatus according to a first embodiment of the present invention.

As shown in FIG. 1, the electric power feeding apparatus 1 includes a protector 2 made of synthetic resin and a wiring harness 6. The protector 2 includes a substantially circular body portion 3 and an elongated guiding cylinder 4 extending upright in a linear fashion. The wiring harness 6 that is wound inside of the body portion 3 in a circular pattern and, guided by the guiding cylinder 4, pulled out of the protector 2. There is provided an opening 30 at an edge (an end) of the guiding cylinder 4. The opening 30 is enlarged in a direction orthogonal to a length of the guiding cylinder 4. Thus, the wiring harness 6 is bent in an intersectional direction indicated by an arrow B, so that the wiring harness 6 can be smoothly pulled out without being rubbed by the edge of the opening 30.

Also, as a foreign matter escape structure of the electric power feeding apparatus 1, there is provided a side opening 32 on a curved wall portion 31 below the opening 30, i.e., proximate to the edge of the guiding cylinder defining the enlarged opening 30 of the guiding cylinder 4. The side opening 32 opens downward while communicating with the opening 30. A foreign matter 10 such as a dust that entered an inside of the protector via the opening 30 can escape from the inside of the protector evacuated to an outside quickly via the side opening 32, as indicated by an arrow C.

The side opening 32 has an arcuate cross section tracing the curved wall portion 31. In the embodiment, an inside diameter (width) of an inner end 32a of the side opening 32 is larger than an inside diameter (width) of the outer end 32b. A lower end 32c of the side opening 32 defines a horizontal plane between the curved wall portion 31 and a wall (one wall) 34 of the guiding cylinder 4. A vertical plane is defined between an upper end 32d of the side opening 32 and a top portion 35 of the curved wall portion 31.

The frontally-viewed shape of the side opening 32 is preferably rectangular at the one wall 34 of the guiding cylinder 4 whose cross section is rectangular. In other words, when the cross section of the guiding cylinder 4 is circular in shape, the frontal shape of the side opening 32 may be circular. By virtue of the side opening 32, intrusion of the foreign matter 10 into the guiding cylinder 4 is prevented, and existence of the side opening 32 contributes to more lightweighted protector 2. The side opening 32 may be called a hole.

The top portion 35 of the curved wall portion projects horizontally, and is positioned opposed to an edge of a horizontal trim 36 (structure) of the automobile body, with a small gap 39 remaining in between. The top portion 35 is on the same level with respect to the trim 36, and an auxiliary component 37 (structure) resides below the trim 36 and in proximity to the curved wall portion 31.

The wiring harness 6 that has been pulled out in the direction indicated by the arrow B via the opening 30 of the guiding cylinder 4 is smoothly bent along the curved wall portion 31, and is pulled out along the top portion 35 of the wall 31 safely without interference with the structures such as the trim 36 and the auxiliary component 37. Thus, reliability of the poser supply by the wiring harness 6 is ensured.

A connector 33 is provided at the upper end of the wiring harness 6.

The connector 33 includes a connector housing (also indicated by the same reference sign 33) made of insulating synthetic resin and terminals (not shown) accommodated therein and retained inside thereof. The terminals are each connected to corresponding electrical wires of the wiring harness 6. The connector 33 is connected to a connector (not shown) of an auxiliary component or a circuit of the deck lid or a roof Preferably, the wiring harness (the electrical wires) 6 is bendably covered and protected by a soft reticular tube.

A portion indicated by the reference sign 31 of the wall defining the opening of the guiding cylinder 4 curves toward the trim 36, and, a portion indicated by the reference sign 38 of the wall exhibits slight curving or slanting in a direction opposed to the trim 36. The slightly curved portion 38 is intended for a case where the wiring harness 6 might be slightly bent in a direction opposed to the trim 36 as it is pulled out. As indicated by the solid line in FIG. 1, when the wiring harness 6 is vertically pulled out, the curved portion 38 is formed upright.

FIG. 2A illustrates a maximum pulled-out (extended) state of the wiring harness 6 as the roof is opened. FIG. 2B illustrates a maximum retracted state of the wiring harness 6 as the roof is closed. As shown in FIGS. 2 and 3, the edge of the top opening 30 of the guiding cylinder 6 communicates with a straight and elongated space 19 like a hole inside of the guiding cylinder. The elongated space 19 communicates with a circular space 15 inside of the body portion 3 (see FIG. 3).

As shown in FIG. 2B, when the roof is closed, the wiring harness 6 is retracted into the guiding cylinder 4 and is slightly bent approximately by 90 degrees along the curved wall portion 31 of the guiding cylinder 4. In this manner, as indicated by the arrow A in FIG. 1, the wiring harness 6 moves in conjunction with a trajectory of the rotation of the movable structure (not shown) such as the roof and the deck lid.

When the wiring harness 6 is pulled out in FIG. 2A, the enlarged opening 30 continuing to the curved wall portion 31 is exposed to the upper space, and accordingly the foreign matter 10 (FIG. 1) may easily get into the protector via the opening. However, the foreign matter that entered the protector via the opening 30 is let out immediately via the side opening 32 continuing to the lower portion of the opening 30. Accordingly, when the wiring harness 6 is bent in FIG. 2B, the foreign matter 10 is not trapped between the inner wall 34a of the guiding cylinder 4 and an outer surface of the wiring harness 6, and pull-out and wind-in operation of the wiring harness 6 can be performed smoothly without getting stuck on the foreign matter. Incidentally, with respect to fine foreign matters that may enter the inside of the protector via a distal region of the opening with respect to the curved wall portion 31, it is preferable, as in the known art, to provide a hole for escape (not shown) is provided at a lowest portion (bottom portion) of the body portion 3 (see FIG. 3).

As shown in FIG. 3, a thick columnar shaft 5 is provided at the center of the inner space 15 of the circular body portion 3 continuing to the guiding cylinder 4 of the protector 2. The wiring harness 6, as it is retracted, is rewound about the shaft 5 in a loop fashion, and the loop portion 6c (i.e., an extra length or wound portion) will be expanded or reduced in size about the shaft 5.

The wiring harness' portion 6d that continues to the loop portion. 6c is pulled out to the outside via a small outlet 16 of the body portion 3, fixed to the outlet 16, and connected to a circuit (not-shown) of a power source (battery) for example via a connector. The shaft 5 defines the smallest diameter of the loop portion 6c and stably supports the loop portion 6c within the body portion 3 as the wiring harness 6 is moved back and forth. Preferably, the electrical wires of the loop portion 6c are coarsely wound by a tape or covered by a soft protective tube so that the electrical wires do not get released.

Figure 12:
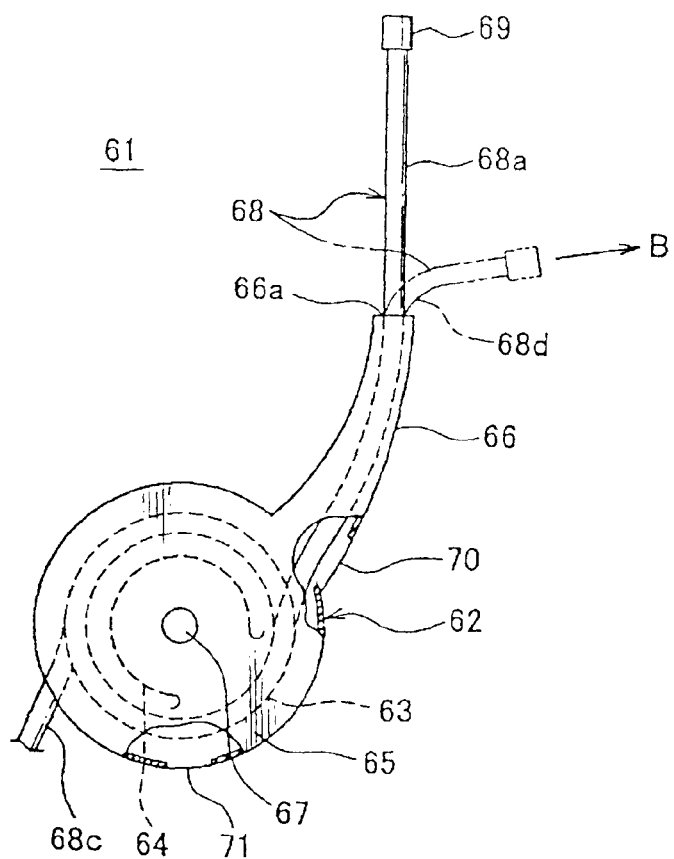
FIG. 12 is a front elevation illustrating one embodiment of a conventional protector structure for an electric power feeding apparatus.

Since neither a conventional drum 63 for rewinding the wiring harness or a spring 64 for energizing the spring as shown in FIG. 12 is not used in the body portion 3 of the first embodiment, the protector is made low-profile and lightweighted with a simple internal structure. The wiring harness takes a form of a loop by virtue of its own rigidity (elastic reaction force) to some extent. It is also possible that the wiring harness 6 is accommodated by the protector 2 in a wave fashion instead of a loop fashion. It may also be bent several times and held in the protector 2. Also, needless to say, the known drum 63 and the spring 64 can be used. Further, although, in the example shown in FIG. 1, the body portion 3 projects in an opposite direction with respect to the bending direction of the wiring harness 6, the body portion 3 may protrude in the bending direction of the wiring harness 6 depending on the design of the automobile body.

The protector 2 includes a protector base 2a and a protector cover 2b. The protector cover 2b is retained by the protector base 2 via a retaining piece (not shown) such as a retaining projection and a retaining frame piece. One end of the shaft 5 is secured to the side wall 17 of the protector base 2a of the body portion 3. The other end of the shaft 5 is preferably positioned to be in a recess (not shown) of the side wall 18 of the protector cover 2b. The shaft 5 may be rotatably provided. The wiring harness 6 is received in the protector base 2a while the protector cover 2b is detached therefrom. The protector 2 may be referred to as a case, the protector base 2a as a case body, and the protector cover 2b as a cover.

FIGS. 4A and 4B illustrate a protector structure for an electric power feeding apparatus according to a second embodiment of the present invention.

This structure includes a second side opening 32' for letting out the foreign matter provided on a wall (the other wall) 34' of the slightly curved portion 38 of the guiding cylinder 4 of the protector 2 of the embodiment illustrated with reference to FIGS. 1 to 3.

Since the construction and arrangement except for the side opening 32' is identical with those of the embodiment shown in FIGS. 1 to 3, detailed description is omitted with the same reference sign assigned to the same element. In FIG. 4, the structures such as the auxiliary component 37 and the trim 36 to which the electric power feeding apparatus is connected to as in FIG. 1 are likewise provided. Needless to say, interference of these structures with the wiring harness 6 is prevented.

The side opening 32' is provided at an edge (upper end) of the other wall 34' and proximate to the opening 30 of the guiding cylinder 4. The small curved portion 38 may be a straight portion that extends vertically in a linear fashion. The side opening 32' has a length approximately equal to that of the side opening 32 on the one wall 37. An upper end 32d' of the side opening 32' is proximate to and immediately beneath the opening 30, and the lower end 32c' is slightly below the lower end of the side opening 32. The upper end 32d' may overlap the small curved portion 38. The size and dimension of the side opening 32' may be determined as required. The both side openings 32, 32' are opposed to each other by 180 degrees in a horizontal direction.

For example, when the roof is closed as shown in FIG. 4B, the foreign matter 10 may enter via the opening 30 onto the bent wiring harness 6. Nevertheless, the foreign matter 10 as shown by the arrow hits the bent portion 6a of the wiring harness 6 and the foreign matter 10 that has bounced laterally gets out of the protector immediately via the opening 32' to the outside.

Even when, the foreign matter is not evacuated via the opening and is placed (trapped) between bent portion 6a of the wiring harness and the wall 34' in a state of FIG. 4B, by virtue of the opening movement as shown in FIG. 4A, as the wiring harness 6 is extended upward, the foreign matter 10 is pressed laterally by the outer surface of the wiring harness 6, so that the foreign matter is evacuated to the outside via the side opening 32'. By virtue of these effects, intrusion of the foreign matter 10 into the protector 2 when closing the roof can be effectively prevented.

The following briefly describes by way of example an operation of the electric power feeding apparatus 1 in relation to opening and closing of a deck lid receiving the retractable roof. Reference is not made to the drawings.

The deck lid (movable structure) is opened and closed by a linkage mechanism. The roof can be retracted by opening upward the deck lid so that a front portion of a rear luggage space of the automobile body (fixed structure) is wide open.

The main linkage is rotated about a shaft driven by a motor (not shown). By movement of a plurality of secondary linkages journaled by the main linkage, the deck lid is opened and closed in an automobile's front-rear direction. The body portion 3 is fixed to the automobile body by a bracket.

The connector 33 provided at the upper end of the wiring harness 6 is connected to the deck lid. By rotating the main linkage downward while the deck lid is opened, and closing the deck lid, the connector 33 fixed to the deck lid tilts approximately horizontally frontward of the automobile, and the wiring harness 6 is pressed into the guiding cylinder 4, and the wiring harness 6 bends frontward of the automobile by 90 degrees on the side of the upper end of the guiding cylinder 4.

Although, in the above embodiment, the present invention is applied to opening and closing of the deck lid adapted to receive a retractable roof, electric power feeding apparatus 1 and its foreign matter escape structure of the present invention is not confined to the deck lid application and applicable by way of example to an upward-downward rotatable rear door structure of an automobile.

The features of the protector structure for the electric power feeding apparatus as described above in the first and second embodiments are summarized as follows:

First, in the protector structure for the electric power feeding apparatus 1 is, the wiring harness 6 is bendably pulled out via the top opening 30 of the guiding cylinder 3 of the protector 2, and the curved wall portion 31 projecting in the bending direction of the wiring harness 6 is formed on the opening 30 of the guiding cylinder 4. The side opening 32 for escaping of the foreign matter, communicating with the lower side of the opening 30, is provided on the wall 31.

With this construction and arrangement, the wiring harness 6, departing a state where it extends straight, is smoothly bent along the curved wall portion 31 at the opening of the guiding cylinder 4. For example, even when the foreign matter enters the protector via the opening 30 enlarged by the curved wall portion 31 while the wiring harness 6 extends straight, the foreign matter 10 is immediately evacuated via the side opening 32 continuing to the opening 30. Thus, the wiring harness 6 is smoothly bent and slid along the wall 31 without being stuck.

Thus, reliability of the power supply is improved by virtue of the curved wall portion 31 of the guiding cylinder 4 that prevents damage to the wiring harness 6 during sliding of the movable structure. Further, although the enlarged opening 30 with the curved wall portion 31 may cause the foreign matter 10 to easily enter via the opening 30, the foreign matter 10 is immediately evacuated via the side opening 32 to the outside. Accordingly, the wiring harness 6 is always smoothly slid without being caught on the guiding cylinder 4 and thus extendability and retractability of the wiring harness 6 is kept in a favorable level, and the reliability of the power supply is increased.

Second, in the first protector structure for the electric power feeding apparatus, the second side opening 32' for escaping of the foreign matter is provided on the wall 34' to be proximate to the opening 30 and opposed to the curved wall portion 31 of the guiding cylinder 4.

By virtue of this construction, even when the foreign matter 10 enters the protector via the opening 30 while the wiring harness 6 is bent along the curved wall portion 31, the foreign matter 10 hits the bent portion 6a of the wiring harness 6, and is let out via the second side opening 32' to the outside.

Since the intruding foreign matter 10 while the wiring harness 6 is bent along the curved wall portion 31 is allowed to escape from the protector to the outside via the second side opening 32', the wiring harness 6 is smoothly swung without getting caught by the guiding cylinder 4, and thus the extendability and the retractability of the wiring harness is kept in a favorable level and the reliability of the power supply is improved.

Third, in the protector structure of the electric power feeding apparatus according to the first and second embodiments, the top portion 35 of the curved wall portion 31 is provided proximate to the structure 36 to which the wiring harness 6 is connected, with the height of the structure being equal to or less than that of the curved wall portion 31, and thus the pulled-out wiring harness 6 that has been bent along the wall 31 is protected against interference with the structure 36.

By virtue of this construction, the wiring harness 6 is curvedly bent along the curved wall portion 31 and is pulled out via the opening 30 so as to be arranged from the top portion 35 of the wall 31, passing above the structure 36, and to a mating element. Thus, interference of the structure 36 with the wiring harness 6 is prevented.

Since the wiring harness 6 is guided by the curved wall portion 31 of the guiding cylinder 4 and is smoothly bent and pulled out without causing interference with the structure 36 to which the wiring harness 6 is connected, damage to the wiring harness 6 is prevented and reliability of the power supply is improved.

Figure 6:
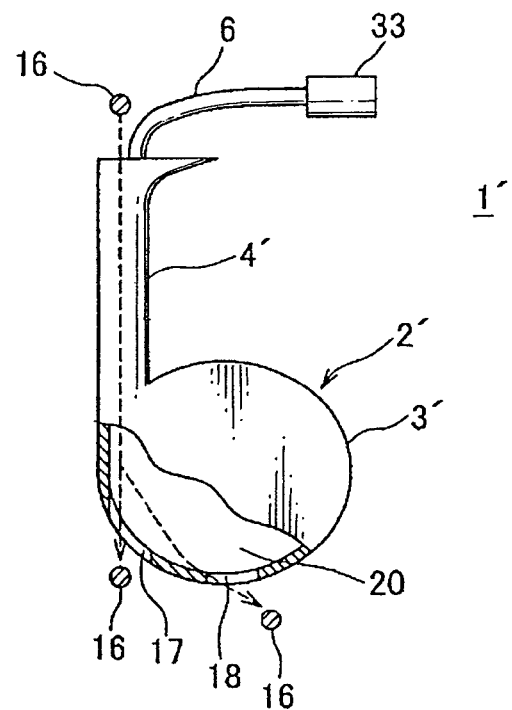
FIG. 6 is a front elevation of the same electric power feeding apparatus partly shown in a longitudinal cross section.

FIGS. 5 and 6 illustrate a protector structure for an electric power feeding apparatus according to a third embodiment of the present invention.

The electric power feeding apparatus 1' includes a protector 2 made of synthetic resin that includes a substantially circular body portion 3 (harness winding portion) and an elongated guiding cylinder 4' (harness extending portion) extending upward in a linear fashion, and a wiring harness 6 that is wound in the body portion 3' and is pulled out along the guiding cylinder 4'. A top opening 30 provided at an edge (upper end) of the guiding cylinder 4' is enlarged in a direction orthogonal to the guiding cylinder 4', by means of which the wiring harness 6 is bent in the orthogonal direction so that the wiring harness can be pulled out smoothly without being rubbed by an edge of the top opening 30.

Further, as the foreign matter escape structure of the electric power feeding apparatus 1', a through-hole like side opening 9 is formed in a shape of a notch proximate to the top opening 30. The side opening 9 is provided on the cylinder wall 8 (the other wall) by 180 degrees opposite the curved wall portion 7 at the upper end defining the enlarged top opening 30 of the guiding cylinder 4'. By virtue of the side opening 9, the foreign matter 10 such as a dust that enters the protector via the top opening 30 is immediately evacuated via the side opening 9 to the outside, as indicated by the arrow C.

The side opening 9 may be called a hole. The side opening 9 communicates with the top opening 30 with a short upper wall 11 in between. Insofar as the strength of the upper portion of the guiding cylinder 4' is sufficient, the upper wall 11 can be eliminated, so that the top opening 30 and the side opening 9 are formed in one piece with each other so as to communicate with each other.

The vertical length B of the side opening 9 when the wiring harness 6 is bent in FIG. 5 is preferably larger than the horizontal length A of the top opening 30, and accordingly the side opening 9 is preferably made larger than the top opening 30 so that the foreign matter 10 entering the protector via the top opening 30 is effectively evacuated via the side opening 9 to the outside, The shown vertical length B is a distance between the edge of the guiding cylinder 4' (upper end 9b of the side opening 9) and the lower end 9a of the side opening 9. However, the vertical length B may be defined as a distance between the lower end of the upper wall 11 (an upper end 9b of the side opening 9) and the lower end 9a of the side opening 9. The horizontal length A is a distance between the outer surface of the cylinder wall 8 and the outer surface of the bent portion 6a of the wiring harness 6. However, the horizontal length A may be defined as a distance between the inner surface of the cylinder wall 8 and the outer surface of the bent portion 6a of the wiring harness 6.

The frontally-viewed shape of the side opening 9 is preferably rectangular at the one wall (cylinder wall) 8 of the guiding cylinder 4' whose cross section is rectangular. When the cross section of the guiding cylinder 4' is circular in shape, the front shape of the side opening 9 may be circular. By virtue of the side opening 9, intrusion of the foreign matter 10 into the guiding cylinder 4' is prevented, and existence of the side opening 9 contributes to the more lightweighted protector 2.

A projection 12 that extends obliquely upward is formed on and in one piece with the inner surface of the cylinder wall 8 at a lower end of the side opening 9. An edge (upper end) 12a of the projection 12 projects in the guiding cylinder 4' with a narrow gap 13 remaining between the projection 12 and the outer surface of the wiring harness 6

The upper end 12a of the projection 12 is formed to take a shape of not an edge but an arc. Even when the wiring harness 6 is slid in contact with the projection 12, there will not be raised a practical problem insofar as a gap 15 is maintained between the opposite outer surface of the wiring harness 6 and the other cylinder wall 14. The projection 12 is provided on the side opposite the bending direction of the wiring harness 6 and projects in the bending direction of the wiring harness 6. Accordingly, at least, it does not frequently interfere with the wiring harness 6 when the wiring harness 6 is bent in FIG. 5, and extension and retraction of the wiring harness 6 is not adversely affected.

The upper end 12a of the projection 12 projects upward above the level of the lower end 9a of the side opening 9, and toward the curved wall portion 7 of the top opening 30. The upwardly sloping surface 12b at the upper side of the projection 12 continues to the lower end 9a of the side opening 9. It is preferable, in view of improved capability of the projection 12 to catch the foreign matter 10, that the projection 12 is formed in a shape of a plate within the range equal to the internal width of the guiding cylinder 4' (width of the cylinder wall 8).

As shown in FIG. 5, the foreign matter 10 that entered the protector via the top opening 30 is brought into contact with the sloping surface 12b on the upper side of the sloping projection 12, and is immediately evacuated to the outside smoothly and effectively along the sloping surface 12b as indicated by the arrow C. The sloping surface 12c on the lower side of the projection 12 is configured to let the wiring harness to slide smoothly without interference when the wiring harness 6 is pulled out upward.

If the projection 12 is not provided, the foreign matter 10 hits the bending surface of the wiring harness 6 that is bent along the curved wall portion 7 as the roof is closed, and then the foreign matter 10 outwardly bounces back from the bending surface and is guided to the outside via the side opening 9. As has been appreciated form the foregoing, use of the projection 12 increases dischargeability of the foreign matter 10.

When the projection 12 is not provided, or when the projection 12 is provided but the fine foreign matter 16 enters the guiding cylinder via the gap 13 between the upper end 12a of the projection 12 and the wiring harness 6 as the roof is closed, the fine foreign matter 16 as shown in FIG. 6 is evacuated via the lower openings (holes) 17, 18 provided on the bottom side of the body portion 3' of the protector 2 to the outside. The top opening 30 of the guiding cylinder 4' communicates with an elongated hole space 19 (FIG. 5) extending in a linear fashion inside of the guide cylinder 4', and the elongated space 19 further communicates with a circular space 20 inside of the body portion 3'.

The lower openings 17, 18 are two in number in the shown example. It is preferable that, like the one lower opening 17, the lower openings pass through the bottom side in a direction perpendicular to the top opening 30, i.e., along the line perpendicular to the top opening 30 in order to let the foreign matter 16 fall inside of the protector 2 so that the foreign matter 16 is evacuated quickly and effectively. The other lower opening 18 is formed at a lowermost portion of the body portion 3', which is preferable in that the much finer foreign matters and drops of water are effectively evacuated. The foreign matter 16 that entered the protector through a region of the cylinder wall 14 (FIG. 5) opposite the side opening 9 as the roof is opened (this means that the wiring harness 6 is extended straight) is evacuated via the other lower opening 18.

Figure 7:
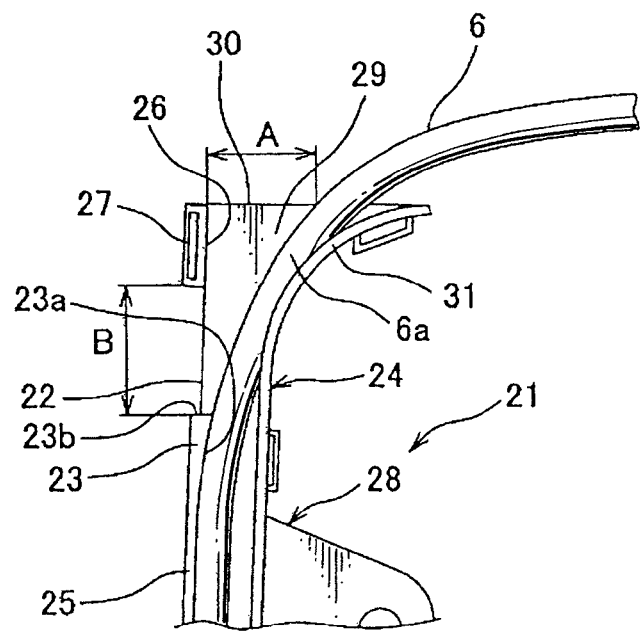
FIG. 7 is a front elevation illustrating an internal space of the protector structure for the electric power feeding apparatus according to a fourth embodiment of the present invention.
Figure 8:
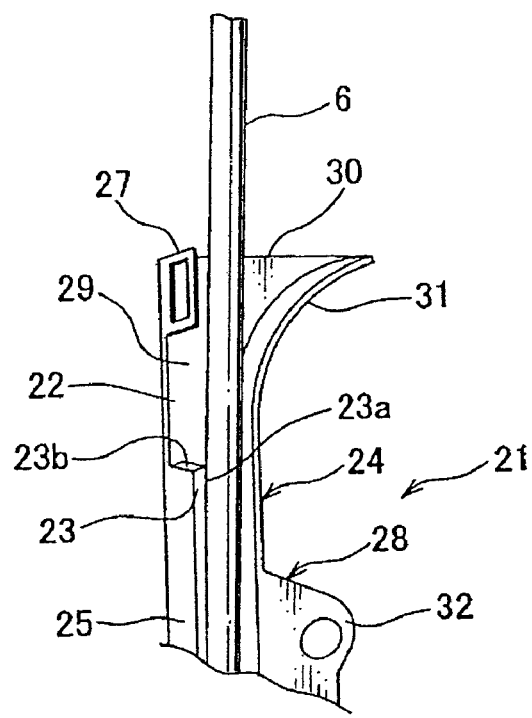
FIG. 8 is a perspective view illustrating the protector structure.

FIGS. 7 and 8 illustrate a protector structure for an electric power feeding apparatus according to a fourth embodiment of the present invention.

In the foreign matter escape structure of the electric power feeding apparatus 21, a side opening 22 is provided lower than in the case of the third embodiment, and, in place of the projection 12 in the third embodiment, at a lower side of the side opening 22, a sloping thick portion 23 is formed in one piece with the inner surface of the cylinder wall 25 of the guiding cylinder 24. The thick portion 23 may be called a projection.

A frame piece 27 for locking is formed on an upper wall 26 on the side of the side opening 22 in one piece therewith. The protector 28 is divided into a front part and a rear part (the figure illustrate a back-side separate protector 28), the two separate protector members are locked with each other by engagement of the frame piece 27 and a retaining nail (not shown). The side opening 22 is formed in an elongated rectangular shape, and the front and rear ends (also indicated by the reference sign 22) of the side opening 22 reach the inner surface of the rear wall 29 of the guiding cylinder 24. a rectangular side opening 22 is formed as a notch on a cylinder wall 25 of at least one of the two separate protector members 28 so as to lock the other one of the separate protector members (not shown), and accordingly the wiring harness 6 is accommodated and protected, with the side opening 22 exposed to an outside. It is preferable, in view of the dischargeabilty of the foreign matter 10 (FIG. 5), that the vertical length B of the side opening 22 is larger than the horizontal length A of the top opening 30.

As the inner surface 23a of the thick portion 23 advances upward, the inner surface 23a slopes such that the inner width of the guiding cylinder 24 is gradually decreased. The thickness of the thick portion 23 is maximum at the lower end 23b of the side opening 22 (upper end surface of the thick portion). The thickness decreases from the lower end of the side opening 23 (upper end surface of the thick portion) 23b downward. The inner surface 23a of the thick portion 23 may be arcuate instead of being oblique.

The thick portion 23 is not so skillfully catches the foreign matter 10 as the projection 12 of the third embodiment. However, since the upper end surface 23b of the thick portion 23 projects radially inward of the guiding cylinder, the upper end surface 23b serves to guiding the foreign matter 10 along the upper end surface 23b toward the side opening 22.

Also, when the roof is closed as shown in FIG. 7, the wiring harness 6 is smoothly bent (curved) along (or in contact with) the sloping inner surface 23a of the thick portion 23 and the curved wall portion 31 of the guiding cylinder 24. Accordingly, the foreign matter that entered the protector via the top opening 30 abuts the upper end surface 23b of the thick portion 23 (lower end surface of the side opening) along the outer surface of the bent portion 6a of the wiring harness 6 and cannot intrude downward any more, and is effectively evacuated via the side opening 22.

When the roof is opened as shown in FIG. 8, the wiring harness 6 is not brought into contact with the thick portion 23 or otherwise lightly in contact therewith, and extended straight in the guiding cylinder 24 and pulled out at a maximum degree via the top opening 30. The protector 28 is secured to the automobile body by means of a bracket 32. When the roof is closed in FIG. 7, the wiring harness 6 is bent and retracted. The wiring harness 6 is displaced corresponding to the rotational trajectory of the movable structure (not shown) such as the roof and the deck lid.

A connector 33 is provided on the side of the upper end of the wiring harness 6 in a manner similar to the embodiment of FIG. 5. The connector 33 includes a connector housing (also indicated by the same reference sign 33) made of insulative synthetic resin and terminals (not shown) accommodated and held thereinside. The terminals are connected to the electrical wires of the wiring harness 6, respectively. The connector 33 is connected to a connector (not shown) of an auxiliary component or a circuit of the deck lid or the roof. The wiring harness (a plurality of electrical wires) 6 is for example bendably covered and protected by a soft reticular tube.

For example, a columnar thick shaft (not shown) is provided at the center of the inner space 20 of the body portion 3' of the protector 2' (FIG. 5). When the wiring harness 6 is accommodated, the wiring harness 6 is in a loop-like manner wound in about the shaft. The loop portion (extra length or rewound portion) is expanded and reduced in size about the shaft.

The harness portion continuing to the loop portion is pulled out of the small outlet (not shown) of the body portion 3 to the outside and fixed to the side of the outlet, so as to be connected to a not-shown circuit of a power source (battery) via, by way of example, a connector. The shaft defines the smallest diameter of the loop portion and, when the wiring harness 6 is extended and contracted, the loop portion is stably supported inside of the body portion 3'. It is preferable that the electrical wires of the loop portion are bound together for example by a tape wound around them in a coarse manner or soft protective tubing to prevent loosening.

A conventional drum 63 for winding the wiring harness or a conventional spring 64 for energization of the drum as shown in FIG. 12 are not provided inside of the body portion 3 according to this embodiment. The protector is low-profile and lightweighted with a simple internal structure. The wiring harness 6 takes a loop shape by virtue of its own rigidity (elastic reaction force). It is also possible that the wiring harness 6 is accommodated by the protector 2', 28 in a wave shape instead of a loop shape or bent several times and held in the protector 2', 28. Also, needless to say, the known drum 63 and the spring 64 can be used. Further, although, in the example shown in FIG. 5, the body portion 3' projects in the bending direction of the wiring harness 6, the body portion 3 may protrude in a direction opposed to the bending direction of the wiring harness 6 depending on the design of the automobile body.

Although the embodiment discussed in the foregoing is an example where the present invention is applied to opening and closing of the deck lid adapted to receive the automobile roof, application of the electric power feeding apparatus 1', 21 and its foreign matter escape structure of the present invention is not confined to the deck lid. For example, it is applicable to an upward-downward rotational rear door of an automobile.

The features of the protector structure for the electric power feeding apparatus according to the third and fourth embodiments described above can be summarized as follows:

First, in the protector structure for the electric power feeding apparatus 1', the wiring harness 6 is laterally and bendably pulled out via the top opening 30 of the upward guiding cylinder 4' of the protector 2'. The side opening 9 for escape of the foreign matter is provided so as to communicate with the top opening 30. The side opening 9 is provided at the wall 8 just below the top opening 30 in the guiding cylinder 4' in the direction opposed to the bending direction of the wiring harness 6. The projection 12 is provided that has an upwardly sloping surface 12b inside of the guiding cylinder 4' and below the side opening 9. The upwardly sloping surface 12b continues to the side opening 9.

By virtue of this construction and arrangement, while the wiring harness 6 is bent, the foreign matter that entered the protector via the top opening 30 hits the bent portion 6*a* of the wiring harness 6 and bounces back outward, and then the foreign matter is evacuated via the side opening 9 to the outside. Also, regardless of bending (pulling-out and winding-in operation) of the wiring harness 6, the foreign matter 10 that entered the protector via the top opening 30 hits the upwardly sloping surface 12*b* of the projection 12 and is guided along the sloping surface 12*b* toward the side opening 9 smoothly. Thus, clogging of the guiding cylinder 4' with the foreign matter 10 is prevented.

Since the foreign matter 10 entering the protector via the top opening 30 is guided along the upwardly sloping surface 12*b* of the projection 12 toward the side opening 9, the foreign matter 10 is effectively evacuated to the outside via the side opening, plugging or clogging of the guiding cylinder due to the existence of the foreign matter can be prevented, and the property of the wiring harness 6 that is pulled out and retracted can be maintained in a favorable state. Also, damage to the wiring harness 6 can be prevented and the reliability of the continuous power supply by the electric power feeding apparatus 1' can be improved.

Second, the wiring harness 6 is bendably pulled out to one side via the top opening 30 of the upward guiding cylinder 24 of the protector 28, and the side opening 22 for evacuation of the foreign matter is provided below the top opening 30, and on the wall 25 opposite the bending direction of the wiring harness 6 within the guiding cylinder 24, the side opening 22 communicating with the top opening 30. Also provided is a thick portion 23 that has a sloping inner surface whose thickness gradually increases upward inside of the guiding cylinder 24, the thick portion continuing to the lower end of the side opening 22.

By virtue of this construction and arrangement, while the wiring harness 6 is bent, the foreign matter that entered the protector via the top opening 30 hits the bent portion 6*a* of the wiring harness 6 and bounces back outward, and then the foreign matter is evacuated via the side opening 22 to the outside. Also, regardless of the bending (pulling-out and winding-in) of the wiring harness 6, the foreign matter that entered the protector via the top opening 30 hits the upper end surface 23*b* of the thick portion 23 and is guided toward the side opening 22. The sloping inner surface 23*a* of the thick portion 23 is in contact with the outer surface of the bent wiring harness 6, so that the bending of the wiring harness 6 is made smoothly and the intrusion of the foreign matter 10 along the sloping inner surface 23*a* is deterred.

The foreign matter 10 that entered the protector via the top opening 30 is guided along the upper end surface 23*b* of the thick portion 23 toward the side opening 22, and thereby the foreign matter 10 is effectively evacuated via the side opening 22 to the outside, and thus the clogging of the guiding cylinder 24 with the foreign matter 10 is prevented, and the pulling-out and winding-in operation of the wiring harness 6 is maintained in a favorable state and damage to the wiring harness 6 is prevented. Also, the reliability of the continuous power supply by the electric power feeding apparatus 21 is improved.

Third, a feature of the protector structure of the first or second electric power feeding apparatus 1', 21 is that the side opening 22 is larger than the top opening 30 as the wiring harness 6 is bent. By virtue of this construction and arrangement, the foreign matter 10 entering the protector via the opening 30 can be effectively evacuated via the side opening 22 that is larger than the top opening 30.

Fourth, a feature of the protector structure for the electric power feeding apparatus according to the first to third embodiments is that the lower opening 17 is provided at the body portion 3' of the protector 2' continuing to the guiding cylinder 4' and on the line perpendicular to the top opening 30.

By virtue of this construction and arrangement, regardless of the bending (pulling-out and winding-in movement) of the wiring harness 6, fine-diameter foreign matter 16 that entered the protector via the top opening 30 (the foreign matter that was not evacuated via the side opening) falls through the guiding cylinder and is evacuated via the lower opening 17 to the outside. The fine foreign matter 16 that was not evacuated via the side opening 9, 32 is quickly and effectively evacuated to the outside via the lower opening 17.

Figure 9:
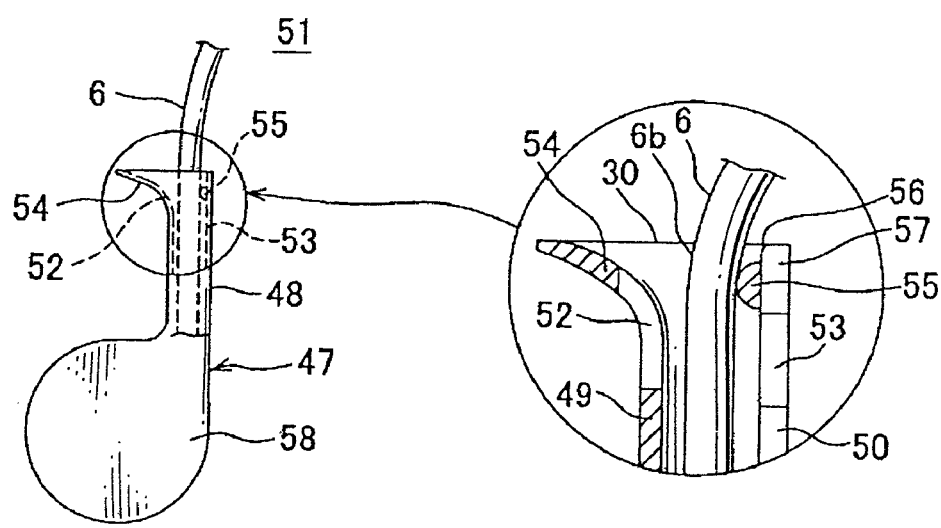
FIG. 9 is a front elevation illustrating the protector structure for the electric power feeding apparatus according to a fifth embodiment of the present invention with enlarged cross-sectional view of the essential part thereof shown in the balloon.
Figure 10A:
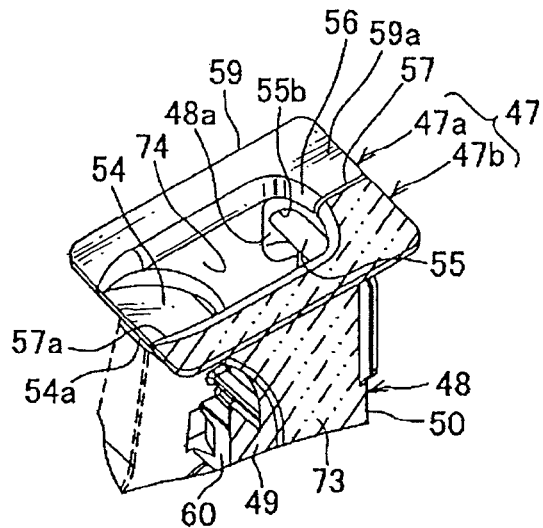
FIG. 10A is a cross-sectional view of the essential part of the protector structure.
Figure 10B:
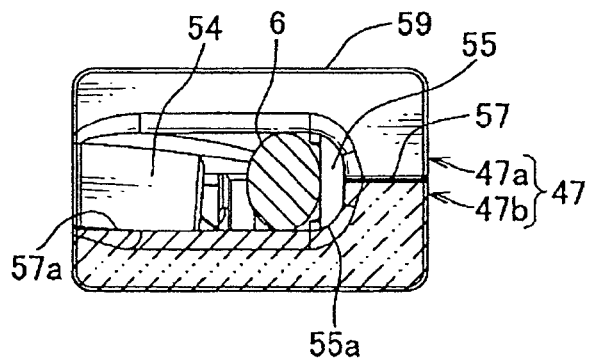
FIG. 10B is a plan view of the essential part of the protector structure of FIG. 10A.
Figure 11:
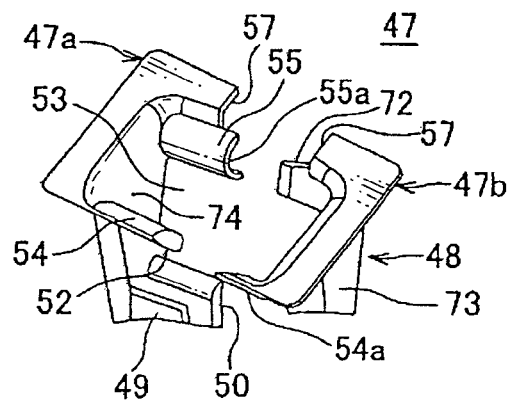
FIG. 11 is an exploded perspective view illustrating the protector structure.

FIGS. 9 to 11 illustrate a protector structure for an electric power feeding apparatus according to a fifth embodiment of the present invention.

As shown in FIG. 9, the electric power feeding apparatus 51, in a manner similar to the fourth embodiment shown in FIG. 8, has the protector 47 that is divided into right and left separate pieces and as in the second embodiment in FIG. 4, side openings 52, 53 are provided on front and rear walls 49, 50 of the vertical guiding cylinder 48 of the protector 47, respectively. Also, there is provided a projection 55 at the rear (the other) wall 50, i.e., the wall 50 opposite the direction of projection of the curved wall portion 54 on the side of the top opening 30, the projection 55 being above the side opening 53. The projection 55 is similar to that of the third embodiment shown in FIG. 5.

The projection 55 has a semicircular cross-section, i.e., a full-radius shape and is provided immediately below the top opening 30, i.e., at an internal molded portion 56 of the upper end of the rear wall 50. The rear-side side opening 53 is provided immediately below the projection 55, and the front-side side opening 52 is provided obliquely forward to be opposed to the projection 55. The front-side side opening 52 is formed from the lower curved wall portion 54 of the top opening 30 toward the front-side (one) vertical wall 49. The orientation such as front, rear, right, and left is defined for convenience of explanation.

By virtue of the projection 55 provided immediately below the top opening 30, the top opening 30 is narrowed and the foreign matter 10 from above hits the projection 55, so that the foreign matter 10 is prevented from entering the guiding cylinder 48. A purpose of the projection 55 other than this is to prevent the wiring harness 6 from touching the joining area 57 (FIG. 10) of the protector 47.

By making the wiring harness 6 in contact with the projection 55, the wiring harness 6 is protected from being brought into contact with the joining area 57. When the wiring harness 6 hits the projection 55, since the projection 55 is formed in a full-radius shape (semicircular cross-section), the angle defined by the wiring harness 6 and the projection 55 always remains the same regardless of the angle of contact made by the wiring harness 6, thereby interference noise is eliminated when the contact is made.

Figure 13:
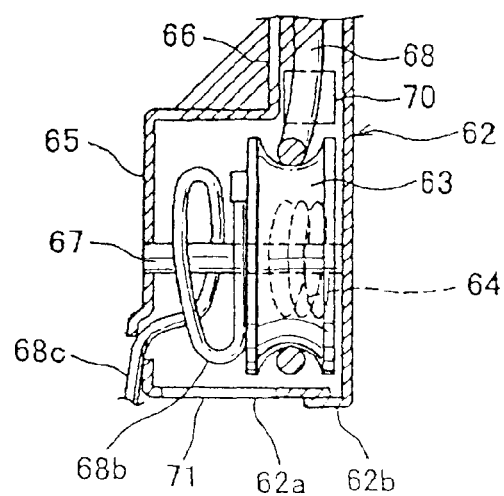
FIG. 13 is a longitudinal cross-sectional view of an internal structure on the side of the body of the conventional electric power feeding apparatus, which is inverted by 90 degrees with respect to FIG. 12.
Figure 14:
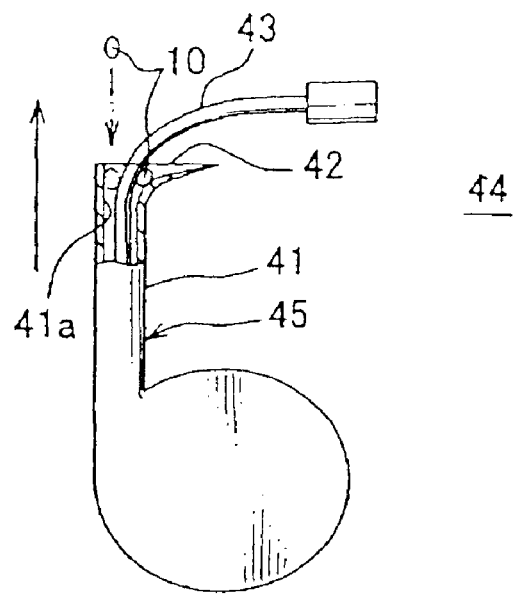
FIG. 14 is a front elevation of another embodiment of a conventional electric power feeding apparatus with a cross-sectional view focusing on a problem that the conventional apparatus addresses.
Figure 15A:
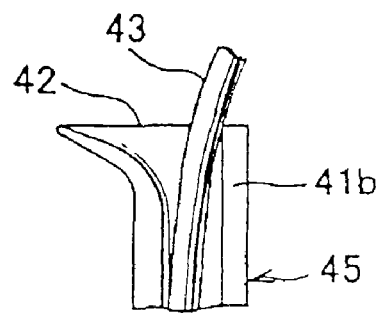
FIG. 15A is a longitudinal cross-sectional view illustrating the essential part of an example of a conventional electric power feeding apparatus along with a problem that the conventional apparatus addresses.
Figure 15B:
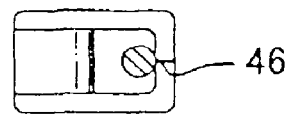
FIG. 15B is a plan view illustrating the essential part of the example of the conventional electric power feeding apparatus of FIG. 15A.

The internal structure of the body portion 58 of the protector 47 in FIG. 9 is the same as that in FIGS. 3 and 13 (either structure of FIGS. 3 and 13 is suitable). Also, the front-side side opening 52 may be formed immediately at the short upper end portion (reference sign 35 in FIG. 1) of the curved wall portion 54 as shown in FIG. 1 (in the example in FIG. 9, relatively long upper end portion is shown).

As shown in FIGS. 10A and 10B, the protector 4 of this embodiment has a horizontal flange 59 at the upper end of the guiding cylinder 48 (in FIG. 9, the flange 59, which can be eliminated, is not shown), and the joining area 57, i.e., a dividing surface is defined at the center of the vertical rear wall 50 of the guiding cylinder 48 from the rear-side flange 59a. In the curved wall portion 54 that continues to the upper portion of the front-side wall 49, the joining area 57a is provided not at the center but a little to the right or to the left, so that the contact of the wiring harness 6 with the joining area 57a is prevented.

In FIG. 10, the portion with hatching by chained lines is the protector cover 47b, and the portion without the hatching is the protector base 47a (the appellation of protector cover 47b and protector base 47a may be inverted). The protector base 47a (one separate protector member) made of synthetic resin and the protector cover (the other separate protector member) 47b made of synthetic resin constitute the protector 47.

The projection 5 with a semicircular cross section is formed in one piece with the protector base 47a. The projection 55 traverses the inside of the guiding cylinder 48 from left to right and extends toward the protector cover 47b. The upper end 55a (free end) of the projection 55 abuts the inner surface of the protector cover 47b. Thus, the joining area 57 of the rear wall 50 is covered by the projection 65, and the wiring harness 6 is in contact with the projection 55, so that the wiring harness 6 is prevented from being in contact with the joining area 57. The base end 55b of the projection 55 continues orthogonally to the rear-side curved surface 48a of the guiding cylinder 48 of the protector base 47a.

The curved wall portion 54 is formed in one piece with the protector base 47a. The short projecting curved wall portion 54a of the protector cover 47b overlaps at the lower side of the curved wall portion 54 (thickness direction) so that the curved wall portion 54 is reinforced. The joining area 57a at the one end of the curved wall portion 54 is covered by the curved wall portion 54a of the protector cover 47b from below. The protector base 47a and the protector cover 47b are engaged with each other by means of a retaining piece 60 such as a retaining frame piece and a retaining nail.

The wiring harness 6, departing from the state shown in FIG. 9, is forwardly bent and is slid along the curved wall portion 54 and brought into the protector 47. When the wiring harness 6 is extended in FIG. 9, the wiring harness 6 is bent backward to abut the projection 55, and thus abutment with the joining area 57 more outward than the projection 55 is prevented (if there is no projection 55, abutment with the joining area 57 occurs). In FIG. 10, the wiring harness 6 has an oval cross section, but may be formed to have a circular cross section. The wiring harness 6 is formed by binding a plurality of electrical wires by a tape or covering them by a soft reticular tube.

As shown in FIG. 11, the protector base 47a and the protector cover 47b are divided into the right and left parts. The projection 55 is foamed hollow and in a semicircular shape. The upper end side half 55a of the projection 55 projects from the dividing surface 57 of the protector base 47a toward the protector cover 47b. At the rear portion of the protector cover 47b, there is protrudingly provided a tongue portion 72 that enters the outer side of the projection 55 to be brought into engagement therewith.

At the front-part of the protector cover 47b, there is protrudingly provided a short curved wall portion 54a that is brought into engagement with the outer side of the curved wall portion 54.

The rear-side side opening 53 is a notch continuing to the lower side of the projection 55 of the protector base 47a. The notch portion of the side opening 53 is covered by the side wall 73 of the protector cover 47b, so that the elongated rectangular rear-side side opening 53 is defined. Also, the front-side the side opening 52 is a notch at the lower side of the curved wall portion 54 of the protector base 47a. The notched portion of the side opening 52 is covered by the side wall 73 of the protector cover 47b, so that the front-side side opening 52 is defined whose shape is an elongated rectangle whose upper portions is curved. The guiding cylinder 48 is defined by front, rear, right, and left walls 49, 50, 73, 74 of the protector 47. The guiding cylinder 48 may be obliquely provided instead of vertically provided.

The features of the protector structure for the electric power feeding apparatus according to the fifth embodiment of the present invention can be summarized as follows.

First, in this protector structure for the electric power feeding apparatus 51, for the first thing, projection 55 is provided at the immediately lower side of the top opening 30 of the guiding cylinder 48 of the protector 47. The projection 55 traverses the inside of the guiding cylinder 48, and the top opening 30 is narrowed by the projection 55. By virtue of this construction, It becomes more difficult for the foreign matter to enter the guiding cylinder 48 via the top opening 30.

Second, in the first protector structure for the electric power feeding apparatus, the side openings 52, 53 are provided at the front wall 49 and/or rear wall 50 of the guiding cylinder 48, and the projection 55 is provided immediately above the side opening 53 of the rear wall 50. The front-side the side opening 52 is provided from the curved wall portion 54 above the front wall 49 toward the front wall 49 (at least at the curved wall portion 54).

By virtue of this construction, when the wiring harness 6 is bent along the curved wall portion 54, the foreign matter that entered the protector via the top opening 30 hits the bent portion 6a (FIG. 7) of the wiring harness 6 and bounces back, so that the foreign matter is evacuated via the rear-side side opening 53 to the outside. With the wiring harness 6 standing upright, the foreign matter 10 that steps in via the top opening 30 falls and escapes from the protector via the side opening 52 of the curved wall portion 54 to the outside. When the wiring harness 6 is raised while being backwardly slightly bent, the foreign matter 10 that entered the protector via the top opening 30 hits the bent portion 6b of the wiring harness 6 and bounces back and is evacuated via the front-side side opening 52.

Third, in the first or second protector structure for the electric power feeding apparatus, the protector 47 is divided into the right and left parts. The one separate protector member 47a has the projection 55 that extends toward the other separate protector member 47b. The joining area 57 of these two separate protector members 47a, 47b is covered by the projection 55.

By virtue of this construction, through contact of the wiring harness 6 with the projection 55, the wiring harness 6 is prevented from being in contact with the joining area 57, so that the strange noise and wear due to contact of the wiring harness 6 with the joining area 57 is prevented and the expansion and contraction movement (pulling-out and winding-in) of the wiring harness 6 relative to the protector 47a can be performed smoothly with a small force.

Fourth, a feature of the protector structure of the first to third electric power feeding apparatus is that the projection 55 has a semicircular cross-section.

By virtue of this construction, angle of contact between the wiring harness 6 and the projection 55 (an angle defined by a tangential line and the projection 55) remains always the same. The wiring harness 6 abuts projection 55 smoothly so that the interfering noise by abutment is prevented and the wiring harness 6 abuts the projection 55 smoothly, and the wear of the wiring harness 6 and noise caused by sliding can be avoided. For example, when the projection 55 protrudes acutely (to be pointed), noise may occur as the wiring harness 6 abuts the upper end of the projection 55. As a result, noise due to sliding and wear of the wiring harness 6 may occur when the wiring harness 6 is slid on the upper end of the projection 55. However, such anxiety is suppressed by the projection having the semicircular (full-radius) shape.

INDUSTRIAL APPLICABILITY

The present invention is applicable to continuous power supply for the automobile's open-close roof, rotatable rear door, and luggage boot, and in general an apparatus in which the wiring harness is bent considerably by substantially 90 degrees frontward and withdrawn in the protector or pulled out straight or in a backwardly bending manner as the movable structure is opened and closed.

REFERENCE NUMERALS

1, 1', 21, 51 Electric power feeding apparatus
2, 2', 28, 47 Protector
4, 4', 24, 48 Guiding cylinder
6 Wiring harness
7, 31, 54 Curved wall portion
8, 25, 34', 50 The other wall
9, 22, 32, 32', 52, 53 Side opening
12, 65 Projection
12*b* Upwardly sloping surface
14, 34, 49 One wall
30 Top opening
47*a* One separate protector member
47*b* The other separate protector member
57 Joining area

The invention claimed is:

1. A protector structure for an electric power feeding apparatus comprising a curved wall portion provided at one wall of an upwardly extending guiding cylinder of a protector, the curved wall portion continuing to a top opening of the guiding cylinder such that a wiring harness is bendably pulled out along the curved wall portion, and the curved wall portion having a first side opening for exiting of a foreign matter, the first side opening being proximate to the opening.

2. A protector structure for an electric power feeding apparatus comprising:
a curved wall portion provided at one side wall of an upwardly extending guiding cylinder of a protector having a first side opening, the curved wall portion continuing to a top opening of the guiding cylinder such that a wiring harness is bendably pulled out along the curved wall portion;
an other side wall of the guiding cylinder; and
a second side opening for exiting of a foreign matter provided on the other side wall of the guiding cylinder, the second side opening being proximate to the top opening and the other side wall being opposite the curved wall portion of the guiding cylinder.

3. The protector structure for the electric power feeding apparatus according to claim 2, further comprising a projection provided inside of the guiding cylinder and on the other side wall thereof, the projection projecting from a lower side of the side opening and having an upwardly sloping surface continuing to the side opening.

4. The protector structure for the electric power feeding apparatus according to claim 2, further comprising a projection provided inside of the guiding cylinder and on the other side wall thereof, the projection projecting from an upper side of the side opening and traversing inside of the guiding cylinder.

5. The protector structure for the electric power feeding apparatus according to claim 4, wherein the protector includes two separate protector members, the one separate protector member having the projection that extends towards the other separate protector member such that a joining area between the separate protector members is covered by the projection.

* * * * *

UNITED STATES PATENT AND TRADEMARK OFFICE
CERTIFICATE OF CORRECTION

PATENT NO. : 8,247,694 B2
APPLICATION NO. : 12/596901
DATED : August 21, 2012
INVENTOR(S) : Tsukasa Sekino et al.

It is certified that error appears in the above-identified patent and that said Letters Patent is hereby corrected as shown below:

On the face of the patent:

Please add the following to (73) Assignees:

Toyota Auto Body Co., Ltd., Kariya-shi (JP)

Signed and Sealed this
Thirteenth Day of November, 2012

David J. Kappos
*Director of the United States Patent and Trademark Office*